United States Patent
Kim et al.

(10) Patent No.: US 8,601,543 B2
(45) Date of Patent: Dec. 3, 2013

(54) MOBILE TERMINAL AND CONTROL METHOD THEREOF

(75) Inventors: Daehee Kim, Seoul (KR); Inhwan We, Seoul (KR); Taesun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/093,751

(22) Filed: Apr. 25, 2011

(65) Prior Publication Data

US 2011/0296493 A1    Dec. 1, 2011

(30) Foreign Application Priority Data

Jun. 1, 2010    (KR) .................. 10-2010-0051585

(51) Int. Cl.
*G06F 7/04*    (2006.01)
(52) U.S. Cl.
USPC .................. 726/3; 726/9; 710/305; 370/311; 455/574

(58) Field of Classification Search
USPC ............ 726/3, 9; 710/305; 370/311; 455/574
See application file for complete search history.

(56) References Cited

U.S. PATENT DOCUMENTS

| | | | | |
|---|---|---|---|---|
| 7,489,659 B2 * | 2/2009 | Siorpaes et al. | ............. | 370/331 |
| 7,801,743 B2 * | 9/2010 | Graves et al. | ..................... | 705/2 |
| 7,953,400 B2 * | 5/2011 | Lee et al. | ...................... | 455/418 |
| 7,969,931 B2 * | 6/2011 | Bachmann et al. | ........... | 370/328 |
| 8,019,322 B2 * | 9/2011 | Satou | ........................... | 455/411 |
| 8,111,878 B2 * | 2/2012 | Sato | ............................. | 382/115 |
| 8,275,988 B2 * | 9/2012 | Fischer et al. | ................ | 713/168 |
| 8,280,053 B1 * | 10/2012 | Giraud et al. | ................. | 380/247 |
| 2004/0210691 A1 * | 10/2004 | Fujii | .............................. | 710/74 |
| 2004/0250002 A1 * | 12/2004 | Hellberg | ........................ | 710/72 |
| 2005/0113071 A1 * | 5/2005 | Nagata | .......................... | 455/411 |
| 2006/0226243 A1 * | 10/2006 | Dariel | ........................... | 235/492 |
| 2007/0197240 A1 * | 8/2007 | Park | ............................... | 455/466 |
| 2007/0294528 A1 * | 12/2007 | Shoji et al. | .................... | 713/159 |
| 2008/0010216 A1 * | 1/2008 | Danzeisen et al. | .............. | 705/71 |
| 2008/0076389 A1 * | 3/2008 | Lee et al. | ....................... | 455/411 |
| 2008/0090520 A1 * | 4/2008 | Camp et al. | ................... | 455/41.2 |
| 2008/0140338 A1 * | 6/2008 | No et al. | ........................ | 702/141 |
| 2008/0220774 A1 * | 9/2008 | Fouquet | ......................... | 455/433 |
| 2008/0268770 A1 * | 10/2008 | Ashbrook et al. | ............ | 455/3.01 |
| 2009/0036097 A1 * | 2/2009 | Satou | ............................ | 455/411 |
| 2009/0043681 A1 * | 2/2009 | Shoji et al. | ....................... | 705/35 |
| 2009/0077592 A1 * | 3/2009 | Kamada et al. | .................. | 725/58 |
| 2009/0122736 A1 * | 5/2009 | Damnjanovic et al. | ........ | 370/311 |
| 2009/0323653 A1 * | 12/2009 | Noda et al. | ..................... | 370/338 |
| 2010/0009625 A1 * | 1/2010 | Chami et al. | .................. | 455/11.1 |
| 2010/0141381 A1 * | 6/2010 | Bliding et al. | ................ | 340/5.61 |
| 2010/0142484 A1 * | 6/2010 | Bachmann et al. | ........... | 370/331 |
| 2010/0191965 A1 * | 7/2010 | Fischer et al. | ................ | 713/168 |

(Continued)

OTHER PUBLICATIONS

Ukhanova, Anna, et. al; Power consumption analysis of constant bit rate video transmission over 3G networks; Aug. 2012. vol. 35,Iss.14; Computer Communications.*

(Continued)

*Primary Examiner* — Luu Pham
*Assistant Examiner* — Angela Holmes
(74) *Attorney, Agent, or Firm* — Lee, Hong, Degerman, Kang & Waimey

(57) ABSTRACT

A mobile terminal and a control method thereof are provided. The mobile terminal selects a method of interfacing an identification device with the mobile terminal according to whether the mobile terminal enters a sleep mode.

3 Claims, 4 Drawing Sheets

(56) References Cited

U.S. PATENT DOCUMENTS

| | | | |
|---|---|---|---|
| 2011/0105077 A1* | 5/2011 | Chandrasekaran | 455/406 |
| 2011/0158143 A1* | 6/2011 | Yun et al. | 370/311 |
| 2011/0252172 A1* | 10/2011 | Sun et al. | 710/305 |
| 2011/0280198 A1* | 11/2011 | Kim et al. | 370/329 |
| 2012/0044887 A1* | 2/2012 | Zdarsky et al. | 370/329 |
| 2012/0210150 A1* | 8/2012 | de Lind van Wijngaarden et al. | 713/320 |

OTHER PUBLICATIONS

Kim, S., Time-based power control architecture for application processors in smartphones; 2012. vol. 48,Iss.25;p. 1632-1634; Electronics Letters (0013-5194).*

Simoens, P., et.al.; Characterization of power consumption in thin clients due to protocol data transmission over IEEE 802.11; 2009. p. 1-7; Modeling and Optimization in Mobile, Ad Hoc, and Wireless Networks, 2009. WiOPT 2009. 7th International Symposium on (978-1-4244-4919-4).*

* cited by examiner

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2010-0051585 filed on Jun. 1, 2010, the contents of which is hereby incorporated by reference herein in its entirety.

BACKGROUND

1. Field

This document relates to a mobile terminal and a control method thereof.

2. Related Art

There is a recent trend of mounting an interface module conforming to the universal serial bus (USB) standard in an identification device storing authentication information for authenticating permissions to use a mobile terminal. However, current consumption of the mobile terminal abruptly increases when the identification device is interfaced with the mobile terminal using USB scheme in spite of many advantages attainable when the identification device is interfaced using the USB scheme. Accordingly, improvement of a structural part and/or software part of mobile terminals is considered.

SUMMARY

An aspect of this document is to provide a mobile terminal and a control method thereof for minimizing current consumption of the mobile terminal while maintaining various advantages attainable when an identification device is interfaced with the mobile terminal through USB scheme.

BRIEF DESCRIPTION OF THE DRAWINGS

The implementation of this document will be described in detail with reference to the following drawings in which like numerals refer to like elements.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system, and so on.

However, those skilled in the art will easily understand that configurations according to embodiments of the present invention can also be applied to stationary terminals such as digital TV and desktop computers except a case where the configurations can be applied to only mobile terminals.

Figure 1:
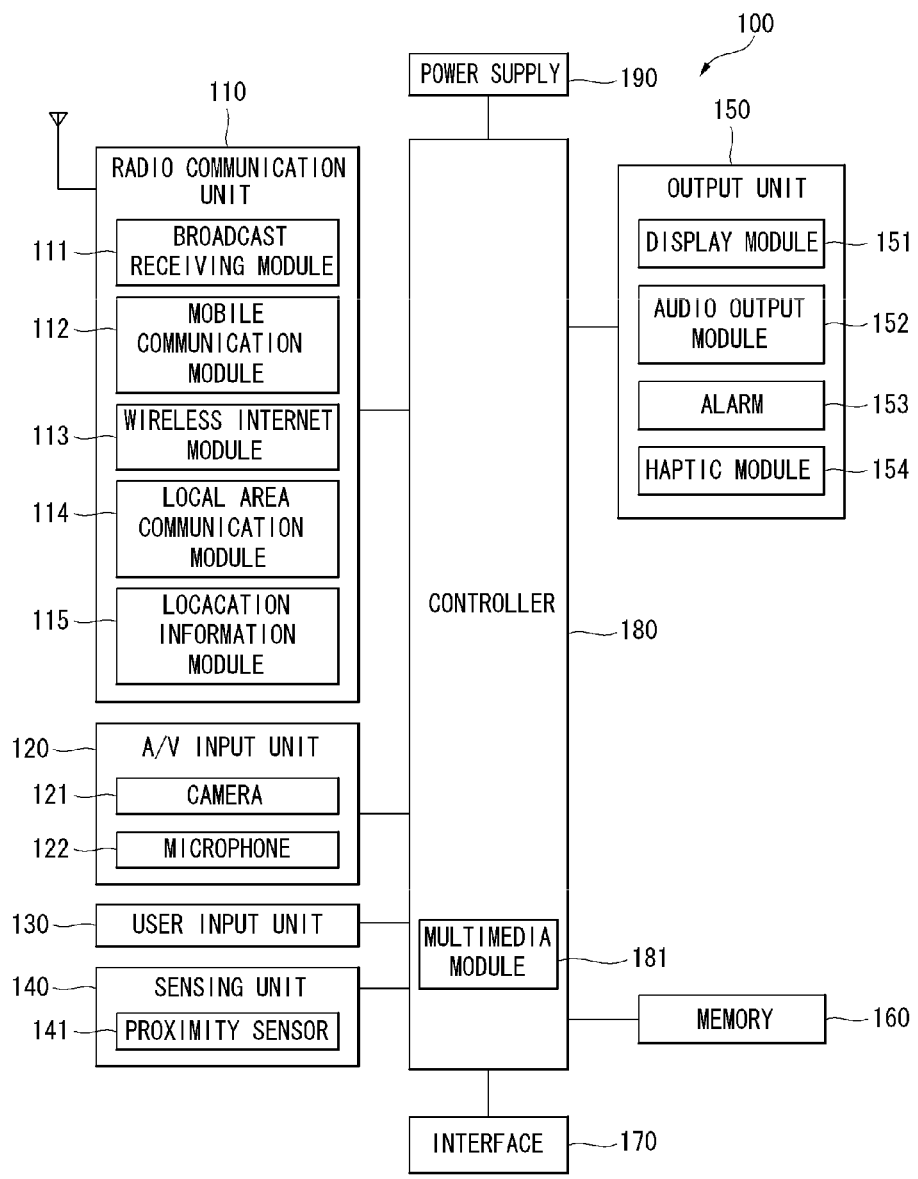
FIG. 1 is a block diagram of a mobile terminal according to an exemplary embodiment.
Figure 2:
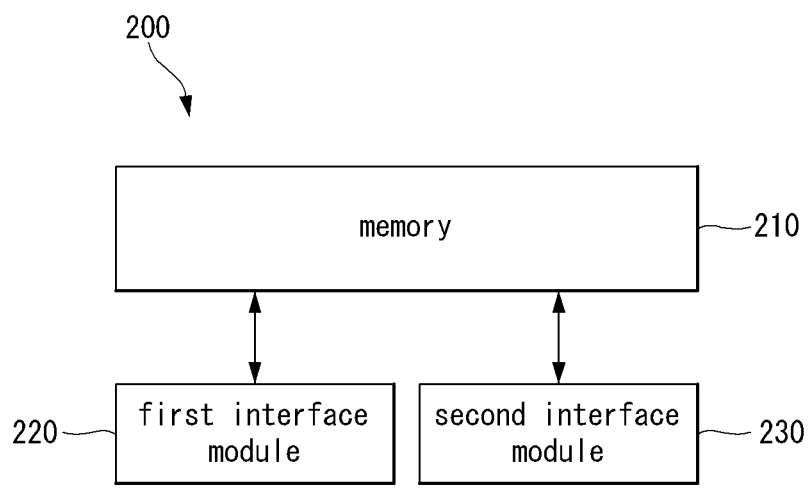
FIG. 2 illustrates a configuration of an identification device related to an embodiment of the present invention.

FIG. 1 is a block diagram of the mobile terminal 100 according to an example embodiment. Other embodiments, configurations and arrangements may also be provided. As shown, a mobile terminal 100 may include a radio communication unit 110, an audio/video (A/V) input unit 120, a user input unit 130, a sensing unit 140, an output unit 150, a memory 160, an interface 170, a controller 180 and a power supply 190. The components shown in FIG. 2 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Embodiments described in this document can be implemented in the mobile terminal 100 explained with reference to FIG. 1.

A control method of the mobile terminal 100 and an operation of the mobile terminal 100 for implementing the control method according to embodiments of the present invention will now be explained. Particularly, a control method of the mobile terminal 100 for interfacing the mobile terminal 100 with an identification device storing information used to authenticate permissions to use the mobile terminal 100 will be described in detail.

In the following description, an identification device that can be interfaced according to USB scheme and international organization for standardization (ISO) scheme is connected to the mobile terminal 100. However, the present invention is not limited thereto. The present invention can be applied to a case that an identification device that can be interfaced with an external device through different interface methods is connected to the mobile terminal 100.

Figure 3:
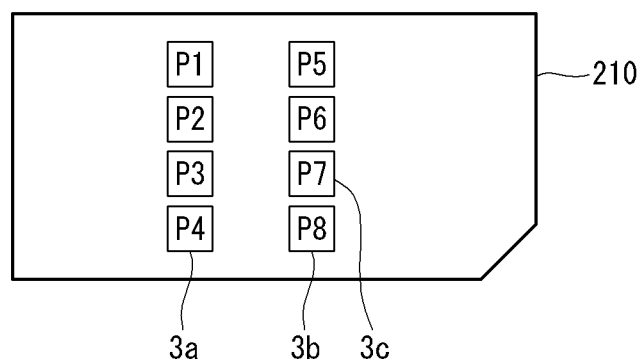
FIG. 3 illustrates the backside of the identification device.

FIG. 2 illustrates an identification device 200 related to an embodiment of the present invention and FIG. 3 illustrates the backside of the identification device 200.

Referring to FIG. 2, the identification device 200 includes a memory 210, a first interface module 220, and a second interface module 230.

The memory 210 stores information used to authenticate permissions to use the mobile terminal 100. In addition, the memory 210 may store data input/output to/from the identification device 200.

The first interface module 220 is interfaced with an external device connected to the identification device 200, for example, the mobile terminal 100, according to the USB scheme. Since the identification device 200 supports USB interface, the mobile terminal 100 can use the identification device 200 as a storage medium for storing large-capacity data such as multimedia data. Accordingly, even when the mobile terminal 100 is changed, a user can use previously stored data only by connecting the identification device 200 with a new mobile terminal without performing a backup operation. Furthermore, the mobile terminal 100 can execute a smart card web server (SCWS) function through Ethernet emulation model (EEM) supported by the USB scheme.

The second interface module 230 is interfaced with the external device connected to the identification device 200 according to ISO scheme.

In the current embodiment, the first interface module 220 and the second interface module 230 are interfaced with the external device using different ports. Referring to FIG. 3, the identification device 200 may include eight ports P1 through P8 to support USB interface and ISO interface. Two ports 3a and 3b are used to transmit/receive data between the first interface module 220 and the external device and a single port 3c is used to transmit/receive data between the second interface module 230 and the external device.

Figure 4:
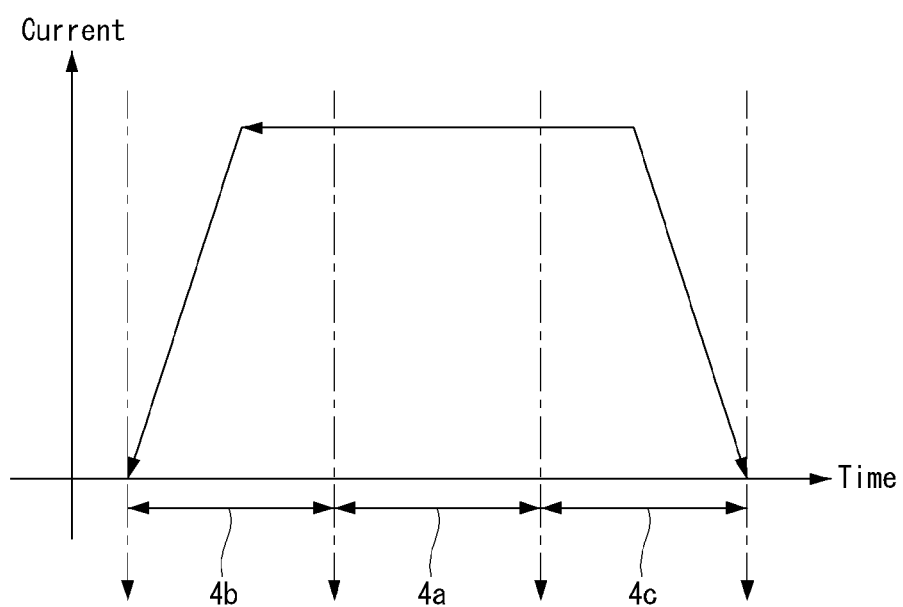
FIG. 4 illustrates consumed current characteristic when the identification device is interfaced using USB scheme.

FIG. 4 illustrates consumed current characteristic when the mobile terminal 100 is interfaced with the identification device 200 according to the USB scheme.

When the mobile terminal 100 is interfaced with the identification device 200 according to the USB scheme, the mobile terminal 100 consumes current more than the current consumed when the mobile terminal 100 is interfaced with the identification device 200 according to the ISO scheme due to USB characteristic. Referring to FIG. 4, when a signal is transmitted/received according to the USB scheme, current is consumed in a USB resume period 4b and a USB suspend period 4c in addition to a period 4a for which the signal is actually transmitted/received.

The mobile terminal 100 periodically transmits/receives a signal for confirming whether the identification device 200 is interfaced with the mobile terminal 100 to/from the identification device 200 to prevent the mobile terminal 200 from being illegally used. Accordingly, the mobile terminal 100 consumes a large quantity of current to periodically confirm whether the identification device 200 is interfaced with the mobile terminal 100 when the mobile terminal 100 is interfaced with the identification device 200 through the USB scheme. The quantity of current consumed by the mobile terminal 100 interfaced with the identification device 200 according to the USB scheme corresponds to more than three times the quantity of current consumed by the mobile terminal 100 interfaced with the identification device 200 according to the ISO scheme.

Accordingly, the present invention provides a method for minimizing the consumed current of the mobile terminal 100 while maintaining various advantages obtained when the mobile terminal is interfaced with the identification device 200 through the USB scheme.

Figure 5:
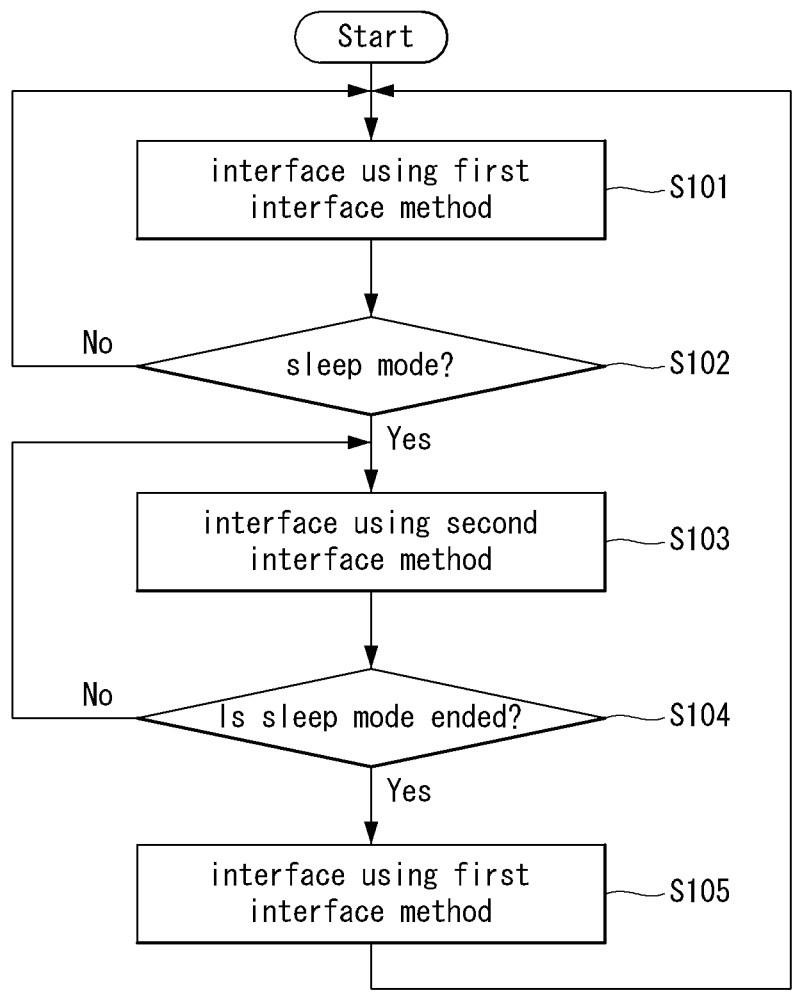
FIG. 5 is a flowchart illustrating a control method of a mobile terminal according to an embodiment of the present invention.

FIG. 5 is a flowchart illustrating a control method of the mobile terminal 100 according to an embodiment of the present invention.

Referring to FIGS. 1, 2 and 5, when the mobile terminal being interfaced with the identification device 200 through the interface unit 170 is turned on, the controller 180 performs a USB initialization operation for interfacing the mobile terminal 100 with the identification device 200. In addition, the controller 180 activates the first interface module 220 of the identification device 200. Upon the completion of the USB initialization operation, the controller 180 controls the interface unit 170 to be interfaced with the identification unit 200 through the USB scheme in operation S101. The second interface module 230 maintains a deactivation state while the controller 180 interfaces the mobile terminal 100 with the identification device 200 through the USB scheme.

When the mobile terminal 100 enters a sleep mode in operation S102, the controller 180 controls the interface unit 170 to be interfaced with the identification unit 200 using the ISO scheme instead of the USB scheme in operation S103. To achieve this, the controller 180 transmits a control signal for deactivating the first interface module 220 of the identification device 200 to the identification device 200 when the mobile terminal 100 enters the sleep mode. In addition, the controller 180 transmits a control signal for activating the second interface module 230 of the identification device 200 to the identification device 200. The sleep mode corresponds to a mode in which the mobile terminal 100 activates a minimum function to save power when the mobile terminal 100 is not used for a predetermine time and thus events such as a call, message reception, etc. and a user's operation are not generated.

When the mobile terminal 100 ends the sleep mode, that is, exits the sleep mode, in operation S104, the controller 180 controls the interface unit 10 to be interfaced with the identification device 200 using the USB scheme instead of the ISO scheme in operation S105. To achieve this, the controller 180 transmits a control signal for deactivating the second interface module 230 of the identification device 200 to the identification device 200 and transmits a control signal for activating the first interface module 220 of the identification device 200 to the identification device 200.

The mobile terminal 100 sets the USB scheme as a method of initially interfacing the mobile terminal 100 with the identification device 200 when turned on in the current embodiment of the present invention. However, the present invention is not limited thereto. The present invention can be applied to a case that the ISO scheme is set as a method of initially interfacing the mobile terminal 100 with the identification device 200 when the mobile terminal 100 is turned on.

When the mobile terminal 100 does not support the USB scheme or the identification device 200 does not include the first interface module 220, the mobile terminal 100 is interfaced with the identification device 200 through the ISO scheme when turned on.

As described above, the mobile terminal according to the above-described embodiment of the invention can be interfaced with the identification device through the USB scheme when being used to use the identification device to execute various functions supported by USB standards. For example, the mobile terminal 100 can store large-capacity data in the identification device or execute the smart card web server function. When the mobile terminal is in the sleep mode, the mobile terminal can be interfaced with the identification device according to the ISO scheme to minimize a current consumed when the mobile terminal is interfaced with the identification device through the USB scheme.

The above-described control method of the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal, comprising:
an interface unit configured to interface with an identification device that stores authentication information for authenticating permissions to use the mobile terminal; and
a controller stored on a memory of the mobile terminal, the controller configured to:
control the interface unit to interface with the identification device according to either a first mode or a second mode;
set an interface mode of the interface unit with the identification device to the first mode when the mobile terminal is powered on;
cause the mobile terminal to enter a sleep mode when a consumption current of the mobile terminal meets a first threshold;
switch the interface mode of the interface unit with the identification device from the first mode to the second mode when the mobile terminal enters the sleep mode;
cause the mobile terminal to end the sleep mode when the consumption current of the mobile terminal meets a second threshold; and
switch the interface mode of the interface unit with the identification device from the second mode to the first mode when the mobile terminal ends the sleep mode,
wherein the identification device comprises a first interface module configured for use with the first mode and a second interface module configured for use with the second mode,
wherein the controller is further configured to cause transmitting of a control signal for activating the second interface module when the mobile terminal enters the sleep mode,
wherein the consumption current of the mobile terminal is, greater when the interface unit interfaces with the first interface module of the identification device than when the interface unit interfaces with the second interface module of the identification device,
wherein the controller is further configured to control the interface unit to interface with the first interface module to periodically receive or transmit a signal for confirming whether the identification device is interfaced with the mobile terminal, and the authentication information,
wherein the controller is further configured to control the interface unit to interface with the second interface module to periodically receive or transmit only the signal for confirming whether the identification device is interfaced with the mobile terminal,
wherein the first interface module corresponds to a universal serial bus (USB) scheme; and
the second interface module corresponds to an international organization for standardization (ISO) scheme.

2. The mobile terminal of claim 1, wherein the controller is further configured to cause transmitting of a control signal for deactivating the first interface module when the mobile terminal enters the sleep mode.

3. A control method of a mobile terminal, the control method comprising:
interfacing with an identification device that stores authentication information for authenticating permission to use the mobile terminal according to either a first mode of a second mode, wherein the identification device comprises a first interface module configured for use with the first mode and a second interface module configured for use with the second mode;

setting an interface mode of an interface unit of the mobile terminal with the identification device to the first mode when the mobile terminal is powered on;

controlling the interface unit to interface with the first interface module to periodically receive or transmit a signal for confirming whether the identification device is interfaced with the mobile terminal, and the authentication information;

causing the mobile terminal to enter a sleep mode when a consumption current of the mobile terminal meets a first threshold;

switching the interface mode of the interface unit with the identification device from the first mode to the second mode when the mobile terminal enters the sleep mode;

controlling the interface unit to interface with the second interface module to periodically receive or transmit only the signal for confirming whether the identification device is interfaced with the mobile terminal;

causing the mobile terminal to end the sleep mode when the consumption current of the mobile terminal meets a second threshold; and switching the interface mode of the interface unit with the identification device from the second mode to the first mode when the mobile terminal ends the sleep mode, wherein the consumption current of the mobile terminal is, greater when the interface unit interfaces with the first interface module of the identification device than when the interface unit interfaces with the second interface module of the identification device, wherein the first interface module corresponds to a universal serial bus (USB) scheme; and the second interface module corresponds to an international organization for standardization (ISO) scheme.

* * * * *